Sept. 27, 1966    A. A. MASTROBATTISTA ETAL    3,275,331
SEAL AND METHOD OF MANUFACTURE
Filed Dec. 21, 1962
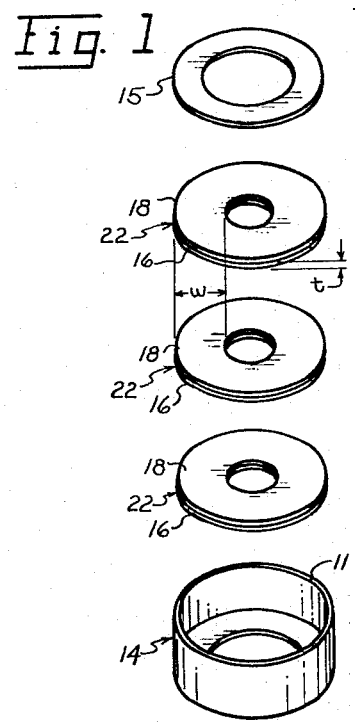
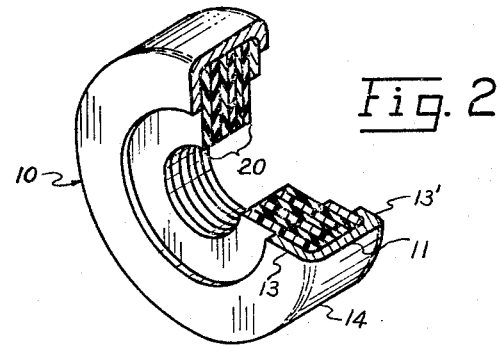
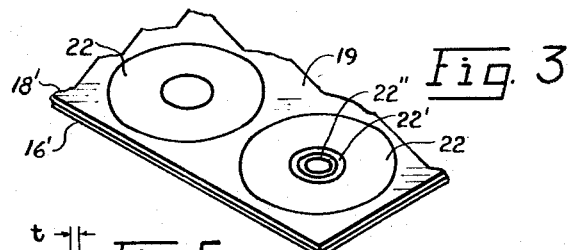
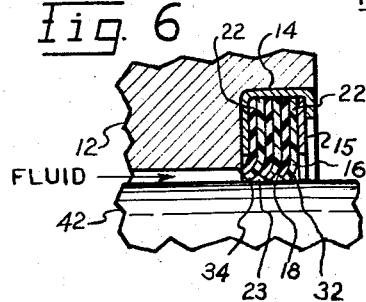
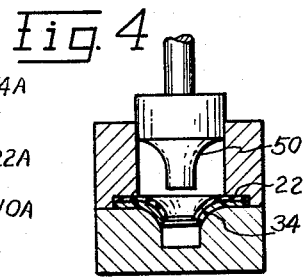
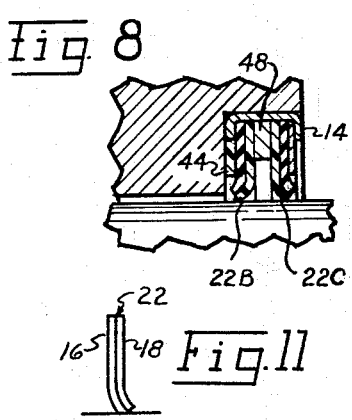
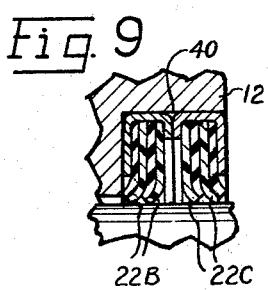
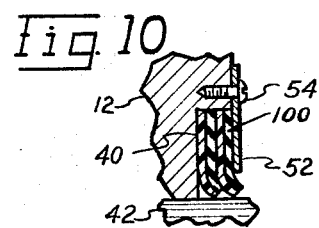
INVENTORS
ALEX A. MASTROBATTISTA
WILLIAM J. FORDON
BY John A. McKinney
ATTORNEY United States Patent Office 3,275,331
Patented Sept. 27, 1966

3,275,331
SEAL AND METHOD OF MANUFACTURE
Alex A. Mastrobattista, Dunellen, N.J., and William J. Fordon, New York, N.Y., assignors to Johns-Manville Corporation, New York, N.Y., a corporation of New York
Filed Dec. 21, 1962, Ser. No. 246,549
11 Claims. (Cl. 277—1)

This invention relates generally to an improved fluid seal. It further relates to fluid-sealing devices, usually for preventing the egress of fluids such as lubricants or coolants and the ingress of contaminants to structures embodying relatively movable members, rotary or reciprocating. Still further, this invention relates to low cost, high production methods for producing such seals.

One of the problems that has plagued the manufacture of seals for dynamic service is that of friction between the seal and a part to be sealed. The problem is compounded in systems employing fluids under high pressures. Of course, limited frictional engagement is necessary between the sealing device and the part to effect the seal. Some of the most effective seals heretofore comprise intricately shaped bodies of elastomeric material molded to very close tolerances and having sleeve-like lip portions resiliently urged into sealing engagement with the part to be sealed, such as a shaft, by metal mechanical elements such as garter springs. These relatively costly seals are effective when first installed; however, after the break-in period the contact area of the rubber with the shaft and the resultant friction increase to the extent that the rubber deteriorates quite rapidly. Furthermore, the excessive force exerted by the spring compresses the rubber to the extent that the rubber loses its resiliency and fails to compensate for eccentricity, misalignment and other distortions in and of the shaft.

Attempts have been made to improve the above-described sleeve-like lip seals by coating the elastomeric material with low friction synthetic resinous materials, particularly Teflon, primarily to render the elastomeric material more corrosion resistant. These coatings have been in the form of films .005 of an inch thick or less, or else in the form of woven fabrics. In the instances where the coatings are in the form of films, the films are sprayed on and consequently uniformity of film and of product varies from one seal to the next since the uniformity of application is contingent upon the skill of the workman applying the film. Furthermore, such thin films are easily "broken through" and consequently have short lives at the crucial areas. Fabric coatings are objectionable in that they fail to provide a continuous face and consequently leakage may occur through their interstices. It has been suggested to fill the interstices with finely divided synthetic resins and also to make the fabric from synthetic resin. However, neither of these constructions provides as positive a seal as an impervious layer since they are both conducive to channeling. Furthermore, complex procedures are required for their manufacture.

Other combinations of elastomeric and low friction synthetic resinous materials have also been suggested heretofore in arrangements wherein the elastomeric material forms the initial and primary seal between the parts to be sealed and the synthetic resinous material serves as a "back-up" or anti-extrusion element for the elastomeric material.

It has also been suggested heretofore to provide a cartridge-type seal embodying a single annulus of filled Teflon. However Teflon does not establish a seal as effective as rubber does, unless considerable force is exerted upon the Teflon. In addition, such synthetic resinous materials as Teflon have a cold-flow characteristic, viz flow or extrude when a light, continuous pressure is exerted. Consequently, unless such flow is restrained or controlled, such materials, per se, soon lose their effectiveness as a seal when placed in service.

An object of this invention is to provide a positive seal for dynamic service and which has an extended life and low frictional engagement with a relatively moving machine part and which maintains the low frictional characteristic over the extended life.

A further object of this invention is to provide an improved seal having low friction characteristics and which is simple to fabricate and assemble.

A still further object is to provide a seal which eliminates the necessity for maintaining the exacting manufacturing tolerances of complex molded sealing elements.

To accomplish the stated objects, the novel sealing device of this invention embodies a laminated annulus comprising a lamina of low friction inert synthetic resinous material and a lamina of elastomeric material. Preferably, each lamina is in the form of a die-cut washer and is essentially thin, i.e., it has a radial width greater than its thickness to render the laminate more deformable in an axial direction than radially.

A plurality of the laminates are preferably encased by a casing of rigid material, such as metal, which casing is adapted to fit in a chamber between the relatively moving parts to be sealed and to be in fixed relation with one of the parts. It is preferred that the annuli fit the chamber radially in a manner whereby they are bent or biased at the periphery in contact with the other of the relatively moving parts.

The washer construction is significant in that the sealing elements may be fabricated without resort to molding operations. The washers may be die-cut from sheet material of uniform thickness. In the preferred form of laminated washer, where the synthetic resinous lamina and the elastomer lamina are bonded together, sheets of synthetic resinous material and elastomer may be bonded together prior to being die-cut and thus concentricity of the two laminae is insured.

The present invention obviates the disadvantages of low friction synthetic resin film coated elastomeric seals by its very simple and facile construction which advantageously and synergistically combines the desirable characteristics of elastomeric materials and of low friction inert synthetic resenous materials. The term "elastomeric" as used throughout this specification and the appended claims is intended to include all rubber and rubber-like materials, including synthetic polymers, having the properties of natural or reclaimed or vulcanized or synthetic rubber. The phrase "low friction inert synthetic resinous material" as employed in the description and the appended claims is intended to include those plastic materials possessing characteristics of the fluorocarbons such as polytetrafluoroethylene, commonly known as Teflon, and nylon and the like and particularly those having a low coefficient of friction, i.e., in the range of .01–.3. Each, or both, of the elastomeric and the low friction inert synthetic resinous materials may contain various well-known fillers.

The invention will be more fully understood and further objects and advantages thereof will become apparent when reference is made to the following detailed description and to the accompanying drawing in which:

FIG. 1 is an "exploded" pictorial view of the components of a preferred embodiment of the seal of this invention;

FIG. 2 is a pictorial view of an assembled preferred seal of this invention, with a portion "broken-away" to illustrate the detail construction;

FIG. 3 is a pictorial view of a laminate from which the sealing elements of this invention may be formed by die-cutting;

FIG. 4 is a schematic cross-sectional elevational view of apparatus for partially preforming or coining a sealing lip of a sealing element before installation;

FIG. 5 is a schematic view illustrating the forces acting upon a sealing element of this invention when in the installed position;

FIG. 6 is a cross-sectional elevational view of the sealing element of FIG. 2 shown installed about a shaft and in fixed relation with the journal housing;

FIG. 7 is a view similar to FIG. 6 of an alternate embodiment wherein the seal is in fixed relation with the shaft;

FIG. 8 is a fragmentary cross-sectional view of another alternate embodiment illustrating the manner in which the sealing element laminates may be spaced apart within a unit;

FIG. 9 is a fragmentary cross-sectional view illustrating double sealing units, one functioning to prevent egress of fluid and the other functioning to prevent ingress of contaminants;

FIG. 10 is a fragmentary cross-sectional view of a packing embodying a sealing element of this invention; and FIG. 11 is a schematic representation of a sealing element showing the sealing arrangement after the break-in period.

Referring to FIG. 1, there is shown a cartridge-type sealing unit, generally designated by the numeral 10. The sealing unit 10 as there shown incorporates three principal elements: an annular casing 14, preferably of rigid material, such as metal, and which may optionally include a washer 15; annuli 16 formed of non-woven inert synthetic resin material having a low coefficient of friction (.01–.3) such as fluorocarbon resins, of which polymerized tetrafluoroethylene sold under the trade name "Teflon" is exemplary; and annuli 18 formed of elastomeric materials, such as rubber or rubber-like materials, and particularly those which are characteristically resilient.

Each of the annuli 16 and 18 is a lamina, as opposed to a mere film, and preferably in the form of a washer having a radial width $w$ greater than its thickness $t$. Each of the washers or annuli 16 is preferably .006–.25 inch thick and the elastomer washers or annuli 18 are preferably at least half as thick as the washers 16 to insure that the washers 16 are resiliently maintained in contact with a member to be sealed. Each of the laminae 16 are also sufficiently thin to accommodate limited flexing or benting and to deter fracture upon such flexing or benting.

The annuli 16 and 18 are arranged in pairs, there being an annulus 18 in each pair. The annuli of a pair are preferably, though not necessarily, adhered together by suitable means, as by cement, at their mutually engaging faces to form a laminate sealing element 22. In the preferred embodiments as illustrated in the drawing, a plurality of laminates 22 are assembled together to form a labyrinth 20. The resinous annulus or lamina 18 of a laminate 22 is slidably movable in respect to the elastomeric annulus or lamina 16 of an adjacent laminate 22. It will be understood that in some applications a single laminate or sealing element 22 may be employed. It will be further understood that while the sealing elements 22 have great utility in the cartridge-type seal employing a casing, such as shown in FIG. 1 and indicated by the numeral 14, the sealing elements 22 may also be employed in a packing-type seal as illustrated in FIG. 10.

In the embodiments where the casing 14 is in fixed and sealing engagement with a journal such as housing 12 shown in FIG. 6, the sealing element 22 have an interference fit with the movable shaft 42 so as to be tensionally biased or deflected at the inner periphery 32, which may be considered to be a lip portion, to form a conoidal sealing area 34. It is preferred to dimension the component laminae 16 and 18 of sealing element 22 in respect to the shaft diameter so that initially the lamina 18 is projected or deflected radially out of contact with the shaft. (FIG. 5). In such arrangement as the lip portion of lamina 16 wears away, some of the resinous material will migrate to the space between the terminal portion of lamina 18 and the shaft 42 and lubricate the terminal portion of lamina 18 as well as the shaft 42.

As the seal is "broken-in" during the initial "run-in" period, and the terminal lip portions of laminae 16 wear, and the laminae 18 make substantially line contacts with the shaft 42 (as shown in FIG. 11), it would normally be expecxted that an increase in frictional resistance would occur between the seal and the shaft. However, there appears to occur in the seal of this invention a synergistic effect between the laminae 16 and the laminae 18. The laminae 16 impart their low friction and lubricating qualities to the laminae 18 without detracting from the sealing characteristics of the elastomeric material. Because of the imparting of lubricity, the objectionable, increased operating temperatures, normally encountered in plain elastomer seals, are not encountered in the seal of this invention. Further, as the elastomer laminae 18, with the thin coating of low friction inert synthetic resinous material on the lip portion, comes into contact with the shaft 42, the elastomer imparts its ability to resist rapid wear to sealing element 22 as a unit. Consequently, the laminate sealing element 22 appears to have properties which each of the separate laminae 16 and 18 do not possess.

The laminae 16 and 18 are also preferably arranged so that lamina 16 is first presented to the fluid to be sealed. Such arrangement provides some protection for the elastomer lamina 18 against corrosive fluids which might otherwise rapidly deteriorate the elastomer material. Anti-corrosion protection against corrosive fluids may also be afforded to the metal casing 14 by inserting an inert synthetic resinous washer 44 intermediate the radial leg 13 of casing 14 and the shaft 42 as shown in FIG. 8. It will become apparent that an anti-corrosive seal may be provided without resort to spray application of protective films.

FIG. 7 illustrates an embodiment of an arrangement wherein the sealing unit 10A is in fixed relation with the shaft of rod 42A (except for the suffix $A$ the reference numerals correspond to those employed in connection with corresponding elements of the arrangement shown in FIG. 6). The sealing elements 22A within chamber 40 having an interference fit with housing 12A so as to be deflected at the outer periphery 46A, which may be considered to be a lip portion, to form a conoidal sealing area 34A. It will be apparent that the sealing arrangement shown in FIG. 7 is literally an inside-out version of that shown in FIG. 6 and that otherwise the operational characteristics of the elements, particularly those of the sealing elements 22A, are the same as those of their corresponding elements.

In FIGS. 8 and 9 are illustrated combination ingress and egress sealing arrangements. In FIG. 8, the lips of an inside sealing element 22B are deflected in a first direction to function as an egress seal and the lips of an outside sealing element 22C are deflected in an opposite direction to function as an ingress seal. Also in FIG. 8, the egress seal and the ingress seal are illustrated as being within the same casing 14 separated by spacer 48. Such spacers 48 may also be employed to space sealing elements 22 which all extend in the same direction. In FIG. 9, separate sealing units 10, with corresponding separate casings 14 are arranged within one chamber 40 of housing 12 to provide a combination ingress seal and egress seal.

In each of the preferred embodiments, the annuli 16 fit the chamber radially and are bent or deflected at a periphery to form a conoidal sealing area 34. The annuli 16 may be force fit to form the conoidal areas 34 or the conoidal areas may be at least partially preformed as by coining, such as illustrated in FIG. 4 by a forming element 50. In order to insure sealing engagement of the annuli 16 with the surface of the part to be sealed and to make the annuli 16 conform to and compensate for any surface irregularities, the annuli 16 are backed by the resilient annuli 18. The terminal or lip portions of annuli 18 correspond substantially to and engage the conoidal area of annuli 16 to constantly urge and resiliently maintain the latter into sealing contact. The interference fit subjects the annulus 16 to tensional forces which are resisted by the compressive forces imposed on the annulus 18 as diagrammatically illustrated in FIG. 5. It is the tendency of the resilient annulus 18 to respond to the compression force which influences and constantly urges the lip portion of annulus 16 into sealing engagement, without extraneous compression or clamping members.

In some low pressure applications it may not be necessary to provide a conoidal sealing surface on the annulus 16, and the radial edge need only be in tangential interference contact with the part to be sealed, i.e., the annuli 16 and 18 are so dimensioned and arranged that when they are positioned about a shaft, they will extend substantially normal to the shaft throughout their lengths. However, this arrangement is not to be construed as a full equivalent of the preferred arrangement wherein the annuli 16 are preformed with or define conoidal portions upon installation.

The concentric labyrinth 20 of sealing elements 22 provides an arrangement which reduces sealing defects due to misalignment of the parts to be sealed and to small foreign particles disrupting the peripheral engagement of one sealing element 22 with the part to be sealed. If one of the sealing elements 22 is disrupted, the others may still maintain sealing engagement. Furthermore, the small space 23 between the terminal portion of an elastomer annulus and the part to be sealed during the initial break-in period will function as a plenum where localized pressures, which may break through the periphery of a first annulus 16 can be dissipated or equally distributed and thus deter disruption of the sealing engagement of the other sealing elements 22.

The relatively small area of contact between an individual annulus 16 and a part to be sealed will also resist shearing or "break through" of the annulus during installation such as may occur with comparatively large contact area elements of the sleeve type when stretched over a shaft.

While the sealing elements 22 are particularly suited as components of a cartridge-type sealing unit 10, they are also of utility as components in a packing assembly 100, shown in FIG. 10 to fill chamber 40 and being retained therein by retaining ring 52, which ring is suitably fastened to housing 12, by means such as screw 54 (see FIG. 10).

FIG. 3 illustrates a composite or laminate sheet 19 from which the laminate sealing elements 22 of this invention may be die-cut. The laminate sheet 19 comprises a layer 16' of low friction inert synthetic resin material and a layer 18' of elastomeric material adhered together by any suitable means, such as by bonding or cementing. Also illustrated is the manner in which a plurality of concentric but different diameter sealing elements 22, 22' and 22", may be simultaneously die-cut.

From standpoint of ease in manufacturing, it is preferred that the radial cross-sections of washers 16 and 18 be essentially uniform and rectangular, however, in some instances it may be desirable to provide a tapering cross-section, i.e., one approaching a triangle. Also from the manufacturing standpoint, it is preferred to make the annuli 16 and 18 with the same radial widths. However, from the standpoint of imparting the lubricity of annulus 16 to annulus 18, it is preferred to provide annulus 16 with an internal diameter smaller than the internal diameter of annulus 18 in a manner whereby a wider band of low friction material will initially come into contact with and lubricate the shaft 42 or journal 12A as the annulus 16 runs in. In any event, as the annulus 16 runs in, the lip portion moves in the direction of the fluid pressure, viz to the right in the seal shown in FIG. 6, and consequently the lip portion of annulus 18 because of its resilience will move radially inward and axially to the right and eventually come into contact with the shaft area initially in contact with the annulus 16.

In forming the preferred embodiment or cartridge-type seal, a plurality of the sealing elements 22 are inserted into the casing against the radial rim 13, a rigid washer 15 may then be optionally placed over the stack of elements 22 and axially compressed together therewith, a portion of the axial rim 11 may then be "rolled" to define another radial rim 13' which is crimped to retain the elements 22 and washer 15 in the axial compressed condition. It will be apparent that the axial compressing and rolling operations may be done simultaneously.

In order to provide a further disclosure of the invention and the advantageous accruing, the following data concerning a cartridge-type seal incorporating three laminates or sealing elements is presented and compared with a cartridge-type seal incorporating a single annulus of filled Teflon:

|  | Combination Teflon and Rubber (3 Laminates) | Filled Teflon (Single Annulus) |
| --- | --- | --- |
| Nominal Axial Width of Cartridge (Inch) | $\tfrac{7}{32}$ | $\tfrac{7}{32}$ |
| Shaft Diameter (Inch) | .625 | .562 |
| Internal Diameter Seal Annuli (Inch) | .565 | .510 |
| Interference between shaft and annuli (Inch) | .060 | .052 |
| Subjected to fluid pressure (p.s.i.) | 50 | 50 |
| R.p.m. of Shaft | 4,000 | 4,000 |
| Forced Heat Source Temperature (° F.) | 275 | 270 |
| Shaft Temperature (° F.) | 260 | 210 |

In each case the forced heat source was a radiant heat lamp placed as close to the seal as possible. The filled Teflon annulus seal started to leak after 18 hours of service and at the end of 100 hours (test was discontinued at end of 100 hours), in one instance the total leakage was 18 cc. of fluid. In contrast, the laminate seal of this invention did not leak during a test run of 200 hours (test was discontinued at the end of 200 hours).

It will be apparent that the instant invention overcomes the noted disadvantages of molded seals and accomplishes the stated objects. When the sealing elements of the instant invention are dimensioned and proportioned in respect to the machine part to be sealed in accordance with the disclosed principles, the axial width space requirements and the exacting requirements as to manufacturing tolerances are both substantially reduced. It is possible to reduce the axial width space accommodating a seal for a given shaft diameter from that required for the sleeve-like lip construction in the order of one-half with the seal construction of the instant invention. Also, multiple sealing lips or areas may be provided in the same axial space required by single lip cartridge-type seals as formerly used in the art.

Although certain and specific embodiments of the invention have been shown and described, many modifications thereof are possible. Therefore, this invention is not to be restricted except as necessitated by the prior art and by the spirit of the appended claims.

What we claim:

1. Cartridge-type sealing means for interposition between relatively movable parts comprising:
   a casing adapted to fit between said parts and for fixed relation with one of said parts; and
   a lamination of essentially thin annuli, each of the annuli having a radial width greater than its thickness, and being disposed radially intermediate of said casing and another of said parts, at least one of said annuli being of inert synthetic resinous material having a low coefficient of friction and having a radial dimension compared to a corresponding radial dimension of said other of said parts to be in at least tangential line contact therewith, and at least one of said annuli being of elastomeric material having a radial dimension substantially corresponding to said radial dimension of said resinous annulus being adapted to resiliently maintain said resinous annulus in contact with said other part, and being positioned to establish at least line contact with said other part as said resinous annulus wears.

2. A cartridge-type sealing unit adapted for sealing a shaft, comprising, in combination:

a casing; and a labyrinth of laminations mounted in said casing and being secured therein, each of said laminations being comprised of an inert synthetic resinous lamina and an elastomeric lamina bonded to said resinous lamina and for cooperative movement therewith, the resinous lamina of one lamination being slidably movable in respect to the elastomeric lamina of an adjacent lamination, each of said laminae having a radial width greater than its thickness, and each of said resinous laminae being sufficiently thin to accommodate limited flexing and to deter fracture upon such flexing, and said laminations being dimensioned in respect to the shaft diameter so that initially the elastomeric laminae are out of contact with said shaft, but as the lip portion of a resinous lamina wears away the corresponding elastomeric lamina may establish contact with said shaft.

3. Cartridge-type sealing means interposed between relatively movable shaft and journal parts comprising:

a casing disposed between said parts and in fixed relation with said journal part; and a lamination of washers, each having a radial width greater than its thickness, disposed radially intermediate said casing and said shaft part;

at least one of said washers being of inert synthetic resinous material having a low coefficient of friction and having an internal diameter at least as small as the outside shaft diameter, and at least one of said washers being of elastomeric material and contiguous to a resinous washer resiliently maintaining said resinous washer in contact with said shaft, and being dimensioned to establish contact with said shaft as said resinous washer wears.

4. A cartridge-type sealing unit, comprising:

an annular casing adapted for fluid tight fixed relation with one of two relatively moving members, said casing shell defining an annular groove for retaining a labyrinth; and a labyrinth of laminations extending radially from said casing comprising:

a plurality of low friction inert synthetic resinous lamina having a sealing portion adapted for sliding, sealing association with a cylindrical surface of the other of said members; and a plurality of elastomer laminae, there being at least one elastomer lamina for each resinous lamina, said elastomer lamina being adapted to resiliently urge a resinous lamina into sealing engagement with said other of said members and to establish sealing engagement with said other of said members when said resinous lamina wears.

5. Sealing means for interposition between relatively movable shaft and journal parts comprising:

a casing adapted to fit between said parts and for fixed relation with one of said parts; and a plurality of flexible annuli radially intermediate said casing and another of said parts, and being coaxial with said shaft, at least one of said annuli being of essentially thin low friction inert synthetic resinous material and having a conoidal portion in engagement with said other part, and at least one of said annuli being of elastomeric material and adhesively secured to an annulus of resinous material, the elastomeric annulus having a conoidal portion corresponding substantially to the conoidal portion of its respective annulus of resinous material, the conical portion of said elastomeric annulus being dimensioned to establish contact with said other part when said respective annulus of resinous material wears but being projected radially so as to be initially out of contact with said other part.

6. A seal between relatively moving parts, comprising:

a plurality of flexible washers, said washers being of low friction inert synthetic resinous material and each having a radial width greater than its thickness; and a back-up element for each of said washers, each of said back-up elements being bonded to its respective washer, and each of said washers being dimensioned to present when installed a conoidal bearing surface to the part being sealed, said back-up element resiliently urging said conoidal bearing surface into contact with the part to be sealed, said back-up elements initially being out of contact with the part to be sealed but being dimensioned to establish contact with said part to be sealed when the respective washer wears.

7. A seal comprising:

a pair of washers bonded to each other to form a lamina, one of said washers being of low friction inert synthetic resinous material and having a relatively thin conoidal lip, when in installed position, and the other of said washers being formed of flexible elastomeric material and resiliently urging said lip radially and axially to maintain positive contact of the lip with a member to be sealed, said other of said washers being dimensioned to establish contact with said members to be sealed when the said one of said washers wears.

8. A cartridge-type seal for interposition between relatively movable parts, comprising:

a casing adapted to fit between said parts and for fixed sealed relation with one of said parts;

said casing including a pair of radial flanges; and a labyrinth of flexible laminates axially disposed and compressed intermediate said radial flanges, each of said laminates comprising a first washer of non-woven inert synthetic resin material having a coefficient of friction in the range of .01 to .3, said first washer having an axial thickness in the range of .006–.25 inch and a radial width greater than its axial thickness, and a second washer of elastomeric material having an axial thickness equal to at least one-half the axial thickness of said first washer and being secured to said first washer for cooperative movement therewith, said first and second washers being proportioned and arranged so that the respective laminate is in biased relation, when installed, with the other of said parts to be sealed, and said second washer is initially out of sealing contact but establishes sealing contact with said other part as said first washer wears, and said second washer also resiliently maintaining the biased portion of said first washer in contact with said other part.

9. The seal as described in claim 8, wherein said inert synthetic resin material is a fluorocarbon.

10. The seal as described in claim 8, wherein the biased portions of adjacent laminates are slidable in respect to each other.

11. The method of establishing a seal between relatively movable parts comprising:
  (a) forming an annulus from inert synthetic resinous material having a low coefficient of friction;
  (b) forming an annulus of elastomeric material;
  (c) positioning said annuli in mutually facing relation between relatively moving parts, with a peripheral portion of each annulus being in biased relation with one of said parts, said annulus of elastomeric material resiliently urging said annulus of resinous material in contact with said one of said parts, and with said annulus of elastomeric material being projected radially to be initially out of contact with said one of said parts; and
  (d) wearing away some of said peripheral portion of said annulus of resinous material, which is initially in biased and contacting relation with said one of said parts, and establishing contact between said one of said parts and said annulus of elastomer material.

References Cited by the Examiner

UNITED STATES PATENTS

| | | | |
|---|---|---|---|
| 2,049,366 | 7/1936 | Gardner | 277—47 |
| 2,167,603 | 7/1939 | Victor | 277—63 X |
| 2,235,735 | 3/1941 | Bernstein | 277—52 |
| 2,586,087 | 2/1952 | Reynolds et al. | 29—148.4 |
| 2,743,119 | 4/1956 | Covert et al. | 277—170 |
| 2,750,212 | 6/1956 | Skinner | 277—153 |
| 2,850,792 | 9/1958 | Cobb | 29—148.4 |
| 3,067,425 | 12/1962 | Colley | 137—223 X |
| 3,099,454 | 7/1963 | Walinski | 277—47 |
| 3,173,696 | 3/1965 | Reinhardt et al. | 277—189 X |

FOREIGN PATENTS

| | | |
|---|---|---|
| 976,666 | 11/1950 | France. |
| 602,746 | 6/1948 | Great Britain. |

SAMUEL ROTHBERG, *Primary Examiner.*